United States Patent [19]

Brisson

[11] 4,264,261

[45] Apr. 28, 1981

[54] REFUSE COLLECTION WITH PLATEN STROKE EXTENSION

[75] Inventor: John R. Brisson, Kingsford, Mich.

[73] Assignee: Lodal, Inc., Kingsford, Mich.

[21] Appl. No.: 932,281

[22] Filed: Aug. 9, 1978

[51] Int. Cl.[3] ........................ B60P 1/00; B65G 25/00; B30B 15/06

[52] U.S. Cl. ............................... 414/525; 100/229 A; 198/736

[58] Field of Search ........................ 414/525, 511-513, 414/497, 516, 509, 521, 458, 499; 198/736, 738; 100/100, 229 A; 92/140, 161

[56] References Cited

U.S. PATENT DOCUMENTS

| | | | |
|---|---|---|---|
| 1,390,695 | 9/1921 | Funkey | 414/525 |
| 2,970,533 | 2/1961 | Allen | 100/229 A |
| 3,049,250 | 8/1962 | Dempster et al. | 100/229 A |
| 3,215,291 | 11/1965 | Nickla | 414/525 |
| 3,486,646 | 12/1969 | O'Brien et al. | 414/525 |
| 3,489,302 | 1/1970 | Danzart | 414/525 |
| 3,901,394 | 8/1978 | Bowles | 414/525 |

FOREIGN PATENT DOCUMENTS

| | | | |
|---|---|---|---|
| 403629 | 6/1966 | Switzerland | 414/509 |

*Primary Examiner*—Leslie J. Paperner
*Assistant Examiner*—R. B. Johnson
*Attorney, Agent, or Firm*—Andrus, Sceales, Starke & Sawall

[57] ABSTRACT

A refuse collection vehicle has a hopper and a rear storage chamber. A compaction and ejection platen is disposed to transfer refuse from the hopper into the storage chamber. A compaction cylinder has a rod which is connected to a guide mounted on the forward side of the platen. The rod is selectively lockable to either the forward or rearward end of the guide to provide either a normal or extended rearward stroke of the platen for refuse compaction or ejection, respectively.

1 Claim, 6 Drawing Figures

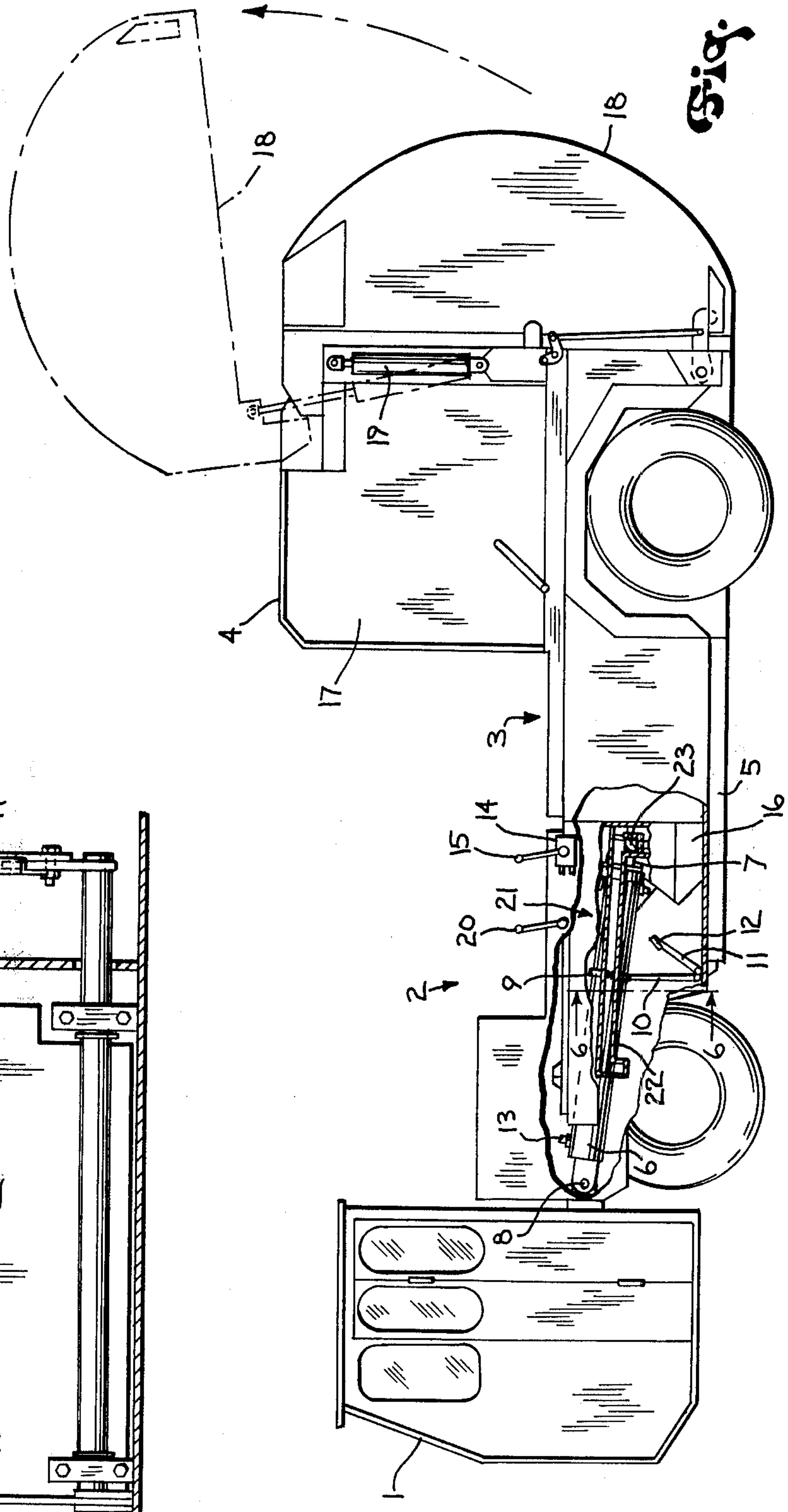
Fig. 1
Fig. 6
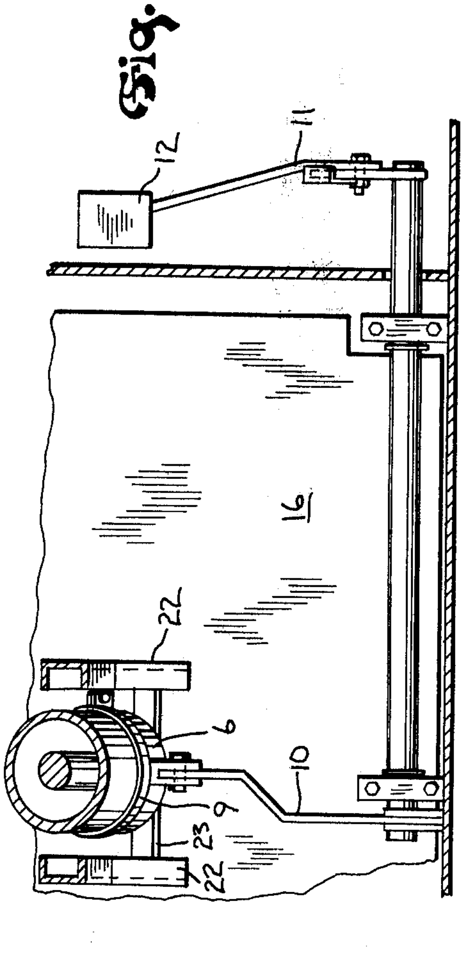

REFUSE COLLECTION WITH PLATEN STROKE EXTENSION

PRIOR ART OF INTEREST

U.S. Pat. No. 3,451,571; J. R. Brisson; June 24, 1969.

BACKGROUND AND SUMMARY OF THE INVENTION

This invention relates to refuse collection and more particularly to a vehicle for receiving, compacting, storing and ejecting refuse.

In some prior devices of this type, a tailgate has been utilized which had a lower bottom portion extending forwardly into the storage chamber to form a floor. When the tailgate was pivotally raised rearwardly during refuse ejection, the refuse tended to spill sideways alongside the vehicle. Such spillage is not desirable, especially when dumping into an incinerator pit or garbage barge.

The present invention solves the above problem and eliminates the need for the tailgate extension, while still permitting full ejection of the load from the storage chamber.

Broadly in accordance with the invention, the compacting platen is provided with a normal stroke for compaction of refuse, and also with a repositioned extended stroke for ejection of the refuse, while the actual position and length of stroke of the compaction cylinder rod remains the same in both instances. This eliminates the need for a compaction cylinder of extra length to accommodate the refuse ejection cycle.

More specifically, a guide is mounted to the forward side of the platen and includes an elongated longitudinal track means terminating at each end in a locking device. The compaction cylinder rod is connected to the guide so that it is shiftable along the track means and is selectively locked at one of the locking devices. When the rod is locked at the rearward end of the guide track means, extension of the rod provides the normal compaction stroke of the platen. When the rod is locked at the forward end of the guide track means, extension of the rod provides the extended platen stroke.

BRIEF DESCRIPTION OF THE DRAWINGS

The accompanying drawings illustrate the best mode presently contemplated by the inventor for carrying out the invention.

In the drawings:

FIG. 1 is a side elevation of a refuse collection vehicle constructed in accordance with the invention, with parts broken away and in section;

FIG. 6 is a vertical section taken on line 6—6 of FIG. 1.

DESCRIPTION OF THE PREFERRED EMBODIMENT

Figure 2:
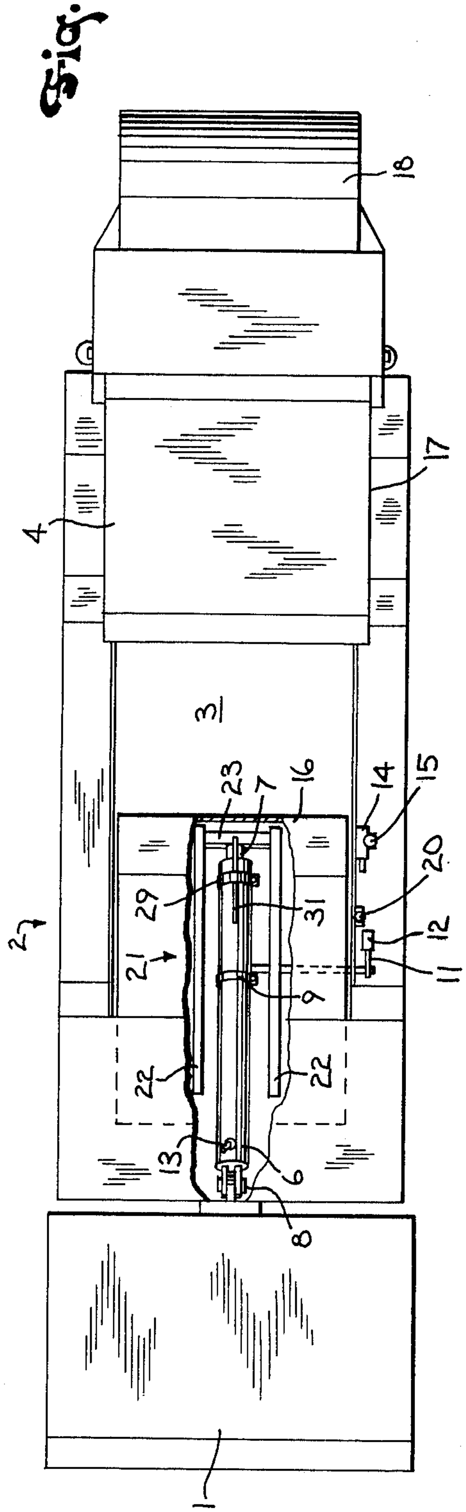
FIG. 2 is a top plan view of the vehicle with parts broken away.

As shown in FIGS. 1 and 2 of the drawings, the refuse collection vehicle comprises generally a forward engine and cab section 1, an intermediate section 2, a loading hopper 3 disposed rearwardly of section 2, and a refuse container 4 at the rear of the vehicle and in communication with hopper 3. All of these elements are supported by a vehicle chassis frame 5 which is shown schematically and which has forward and rearward portions.

Intermediate section 2 contains a longitudinally extending compaction cylinder 6 having a piston rod 7 which extends from the rear thereof. The forward end of cylinder 6 is mounted to a forward portion of frame 5 on a transverse horizontal axis defined by pivot pin 8. The cylinder is adapted to be selectively raised and lowered about pin 8, and for this purpose, a strap 9 extends about the cylinder body and is connected through a pair of lever arms 10, 11 to a foot pedal 12.

Cylinder 6 is connected through suitable fluid lines 13 to a control valve 14 having a manually actuatable handle 15 which is moved to extend or retract piston rod 7, as will be described more fully hereinafter.

Hopper 3 is open-topped and has a platen 16 disposed therein which, during dumping into the hopper, is positioned at the forward hopper end, as shown in FIG. 1. Platen 16 is mounted on frame 5 for reciprocal rearward and forward movement relative to container 4.

Hopper 3 communicates with refuse container 4 which forms a refuse storage chamber 17. The rear portion of container 4 includes a tailgate 18 which is pivotally mounted at the top and which is normally closed, but which may be opened upwardly for refuse ejection by means of a cylinder-piston assembly 19 actuated by any suitable well-known means, including a manual control lever 20.

The vehicle is designed to receive refuse and the like into hopper 3 and transfer the refuse into storage chamber 17 where the refuse is compacted. The design furthermore contemplates ejection of refuse rearwardly from chamber 17.

It is desired to utilize platen 16 for refuse transfer into and compaction within chamber 17, and also for refuse ejection therefrom. It is further desired to utilize a cylinder 6 having the shortest stroke possible in the interest of cost and efficiency.

For this purpose, means are provided to connect piston rod 7 to platen 16 in such a manner that the effective stroke of platen 16 is variable in position. Thus, the platen may be driven from adjacent cylinder 6 through hopper 3 to adjacent container 4 for refuse compaction. Alternately, the platen may be driven from the forward portion of container 4 and rearwardly through storage chamber 17 to eject refuse when tailgate 18 is raised. In both instances, the actual stroke of piston rod 7 remains the same.

Figure 3:
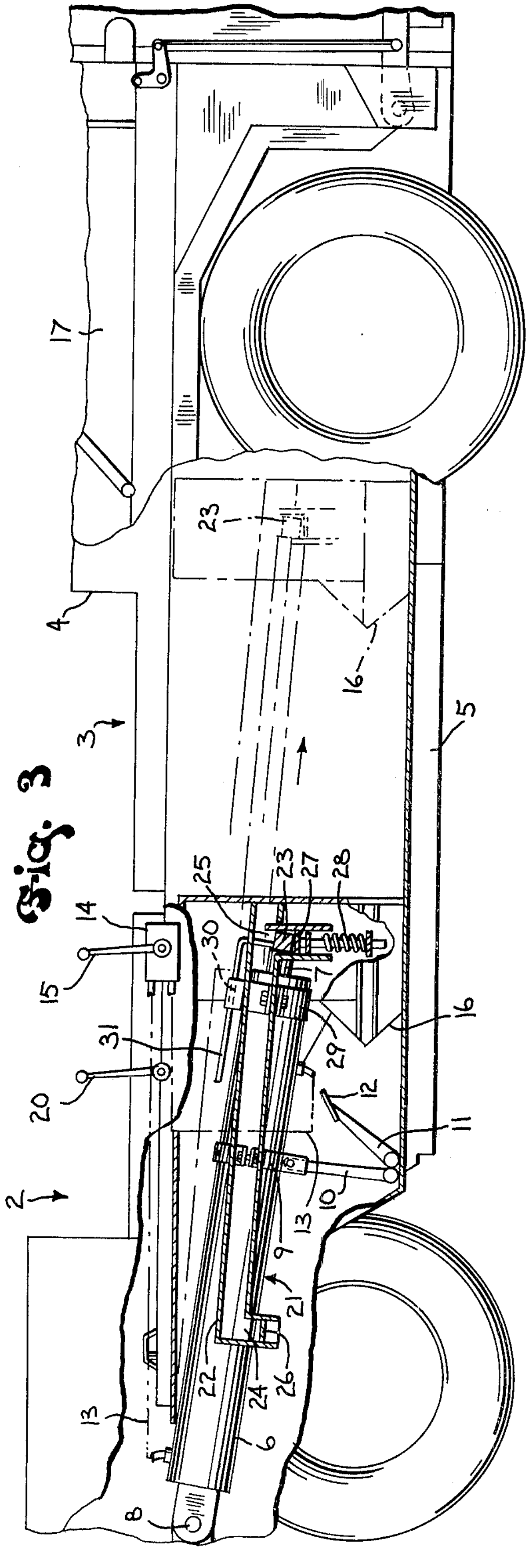
FIG. 3 is an enlarged schematic side view of the rear portion of the vehicle with the cylinder rod locked at the rearward portion of the guide, and showing both retracted and extended rod positions.

As best seen in FIGS. 1–3, a guide device 21 is adapted to connect piston rod 7 with platen 16 and to effectively alter the relative longitudinal positions of the piston and platen as desired. Guide device 21 is shown in this embodiment as comprising a pair of transversely spaced longitudinally extending elongated parallel tracks 22, the rearward ends of which are fixedly mounted to platen 16. The outer rear end of piston rod 7 is provided with a transversely extending connector pin 23, the outer ends of which are mounted in tracks 22.

For purposes of the invention, lock means are provided to fixedly position pin 23 at either the forward or rearward end portions of tracks 22. For this purpose, the central portions of tracks 22 are generally level, with the front end portions thereof dropping off into downwardly extending slots 24 and the rear end portions dropping off into downwardly extending slots 25. The respective slot floors 26,27 may be rigid, or may be provided with shock absorbers 28 if desired.

Pin 23 is adapted to be locked in position in either front slots 24 or rear slots 25.

Referring to FIG. 3, when it is desired to provide a normal compaction stroke of platen 16, pin 23 is positioned in rear slots 25 of tracks 22. When piston rod 7 is retracted, as shown in full lines, platen 16 is also in its retracted position at the forward end of hopper 3 and tracks 22 are disposed on each side of cylinder 6. To shift refuse dumped into the hopper rearwardly and compact it in storage chamber 17, valve handle 15 is turned to extend rod 7 rearwardly. This will drive platen 16 rearwardly to the position shown in phantom lines. Because the rod is locked to tracks 22 at rear slots 25, the tracks will follow along behind. After compaction, rod 7 may then be retracted to its original position, carrying tracks 22 and thus platen 16 with it.

Figure 4:
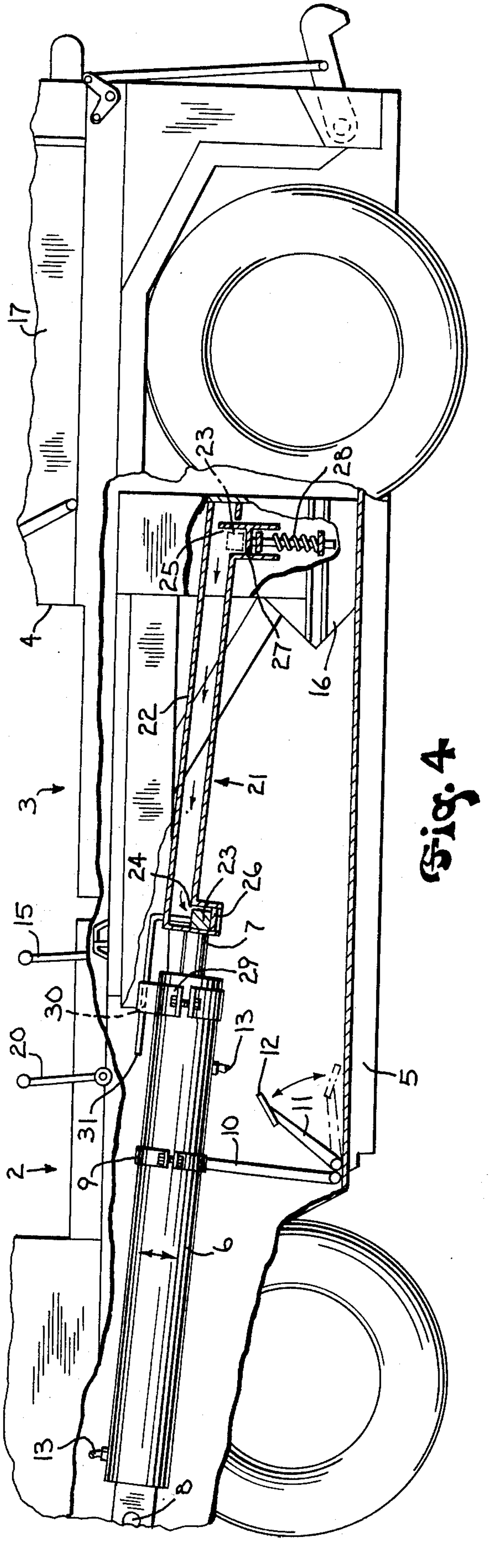
FIG. 4 is a view similar to FIG. 3 and showing movement of the cylinder rod to a locked position at the forward portion of the guide.

When it is desired to open tailgate 18 and eject the refuse from chamber 17, and referring to FIG. 4, the platen 16 is first extended as in FIG. 3. Foot pedal 12 is then engaged to lift cylinder 6 about pivot pin 8, causing transverse pin 23 to be lifted out of rear slots 25. Piston rod 7 is then retracted, causing pin 23 to retract and slide along tracks 22 until it falls into front slots 24 as shown by the arrows and full lines. Rod 7 is now effectively locked to the front of tracks 22 with the tracks extending rearwardly therefrom and platen 16 now positioned adjacent container 4.

Figure 5:
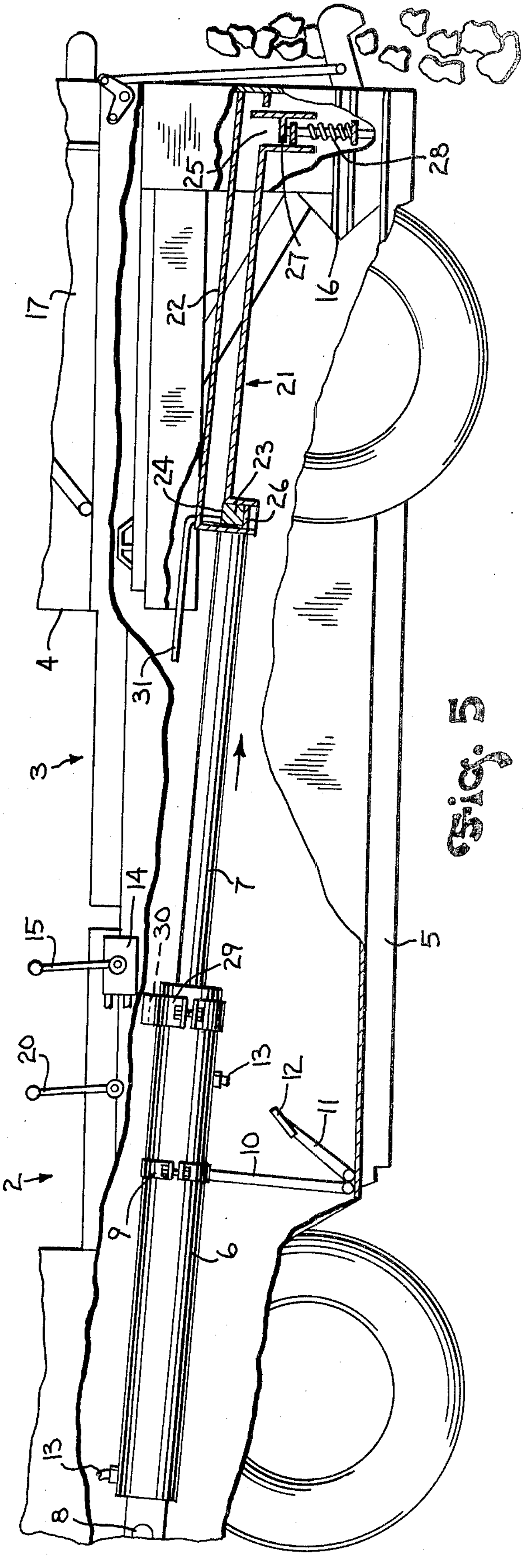
FIG. 5 is a view similar to FIGS. 3 and 4 and showing the extended platen stroke for ejection.

Actuation of handle 15 now causes piston rod 7 to again extend rearwardly, but because of the effective extension of the rod, the stroke of platen 16 occurs within chamber 17, thus causing the refuse to be ejected to the rear as shown in FIG. 5.

After the ejection stroke, rod 7 and its attached tracks 22 and platen 16 are retracted. Foot pedal 12 is again actuated to lift pin 23 from front slots 24, and rod 7 is extended until pin 23 falls back into rear slots 25, thus returning the parts to the position shown in FIG. 3 for further refuse compaction.

By mounting an extension device on platen 16, the stroke of the platen can be effectively repositioned between a forward and rearward location, while maintaining a single stroke length and position of piston rod 7.

If desired, a device may be provided to assure proper alignment of piston rod 7 upon retraction. As best seen in FIGS. 3–5, a collar 29 is mounted adjacent the rear of cylinder 6, with the collar having a guide opening 30 therein. A guide rod 31 is mounted to piston rod 7 and extends forwardly and enters opening 30 when piston rod 7 is retracted.

Various modes of carrying out the invention are contemplated as being within the scope of the following claims particularly pointing out and distinctly claiming the subject matter which is regarded as the invention.

I claim:

1. In a vehicle for handling refuse:

(a) a longitudinal frame having forward and rearward portions, (b) a hopper on said frame for receiving refuse, (c) a refuse storage compartment disposed on said frame rearwardly of said hopper and in communication with the latter, (d) a platen normally mounted in said hopper and movable between forward and rearward positions for transferring refuse from said hopper to said storage compartment, (e) a piston rod and cylinder assembly carried by said frame and disposed ahead of said hopper and operatively connected to said platen to selectively move said platen between positions, said cylinder and rod assembly being pivotally mounted at one end on said frame on a fixed horizontal transverse axis, (f) longitudinally extending movable connector means connecting said piston rod and said platen and including means for selectively interconnecting said piston rod and said connector means at one of a plurality of selected longitudinal positions on said connector means to effectively alter the stroke of said platen, said connector means further including track means mounted to said platen and a pin mounted on said piston rod and disposed on said track means, (g) means defining a plurality of pin receiving slots in said connector means, one of said slots being disposed adjacent the forward end of said connector means and another slot disposed adjacent the rearward end of said connector whereby when said pin is positioned within the rearwardly disposed slot, the stroke of the platen is confined to the hopper and when the pin is positioned within the forwardly disposed slot, the stroke of the platen is extended into the storage compartment, (h) means for selectively moving said pin into and out of either of said slots to connect and disconnect said piston rod and said connector means, said means for moving said pin between connecting and disconnecting positions including manually actuatable lever control means connected to said cylinder to pivot said cylinder about said fixed horizontal transverse axis.

* * * * *